United States Patent [19]
Eynard

[11] Patent Number: 4,716,762
[45] Date of Patent: Jan. 5, 1988

[54] LEVEL SENSOR FOR USE WITH AN ELECTRICALLY INSULATING LIQUID

[75] Inventor: Denis H. Eynard, Paris, France

[73] Assignee: Jaeger, France

[21] Appl. No.: 885,236

[22] Filed: Jul. 14, 1986

[30] Foreign Application Priority Data

Jul. 15, 1985 [FR] France .................... 85 10810

[51] Int. Cl.$^4$ .............................. G01F 23/24
[52] U.S. Cl. ...................... 73/295; 73/304 R
[58] Field of Search ................ 73/295, 304 R

[56] References Cited

U.S. PATENT DOCUMENTS

| | | | |
|---|---|---|---|
| 2,351,101 | 6/1944 | Brelsford | 73/313 |
| 3,205,709 | 9/1965 | Gearing et al. | 73/295 |
| 3,543,586 | 1/1970 | Waute | 73/431 |
| 4,411,155 | 10/1983 | Coulange | 73/295 |
| 4,583,401 | 4/1986 | Schlindwern et al. | 73/295 |

FOREIGN PATENT DOCUMENTS 2367276 5/1978 France .
0129741 7/1919 United Kingdom .................. 73/295

Primary Examiner—Daniel M. Yasich

[57] ABSTRACT

The sensor comprises an elongate housing fixed in a liquid-containing casing, said housing having a V-shaped heat sensitive resistive wire disposed longitudinally therein and connectable to a feeder and processor circuit enabling the liquid level inside the casing to be monitored at any moment. The sensor includes means for positioning the heat sensitive wire (6) so as to ensure that there is a substantially constant gap between the two branches thereof, and also so as to ensure that the plane defined by the the wire remains in a substantially stable position relative to the housing. A resilient fastening member (11) is provided for fastening the point of the V-shape and for bearing against some of said positioning means. The invention is applicable, in particular, to monitoring the level of oil in the sump of the engine or the gearbox of a motor vehicle.

9 Claims, 9 Drawing Figures

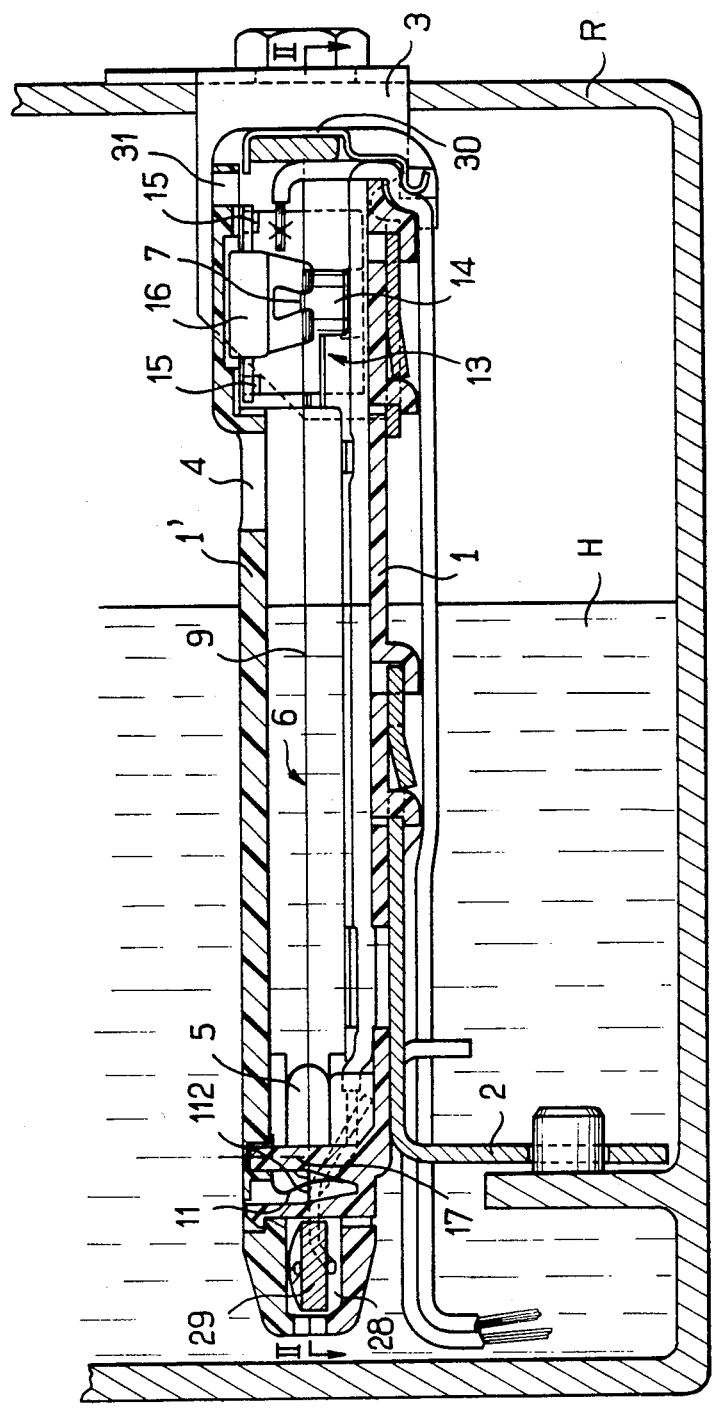
FIG_1

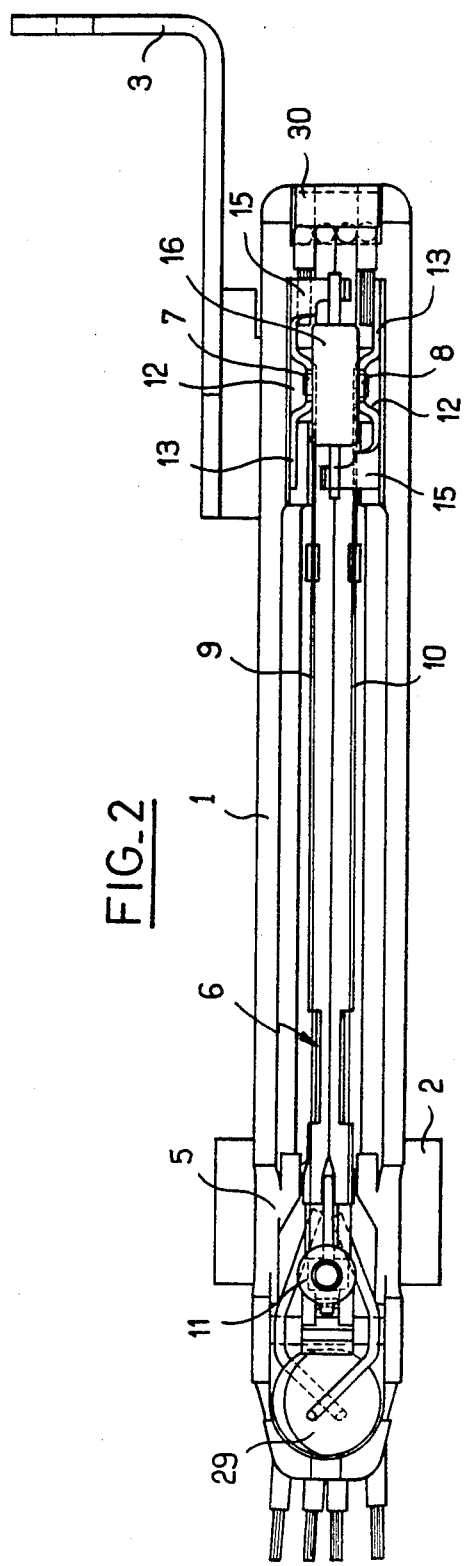

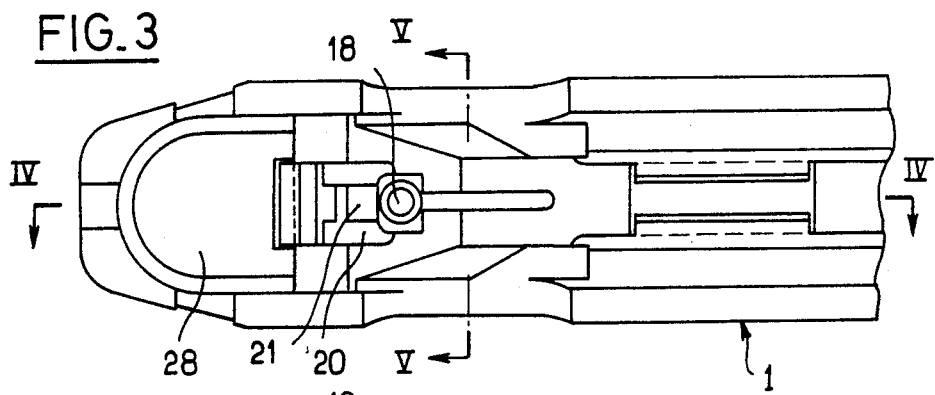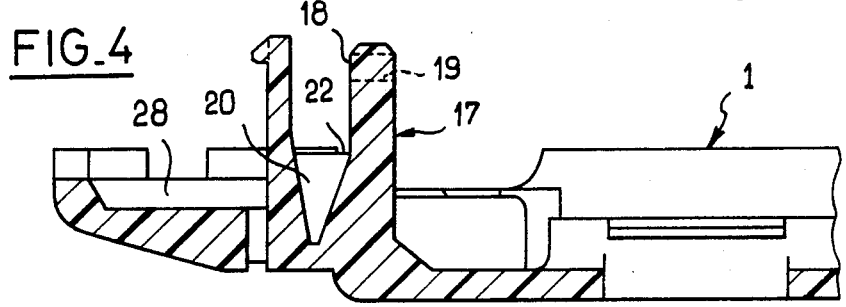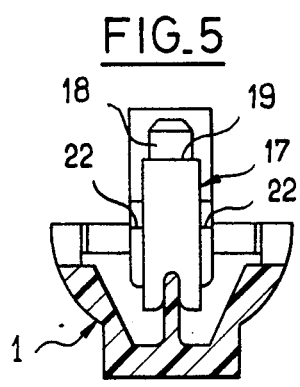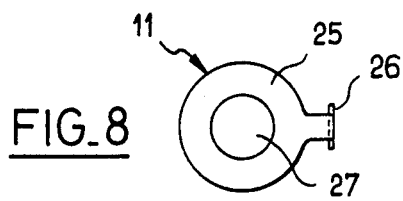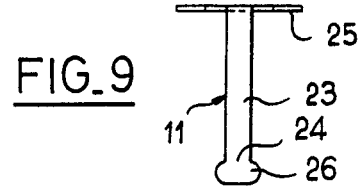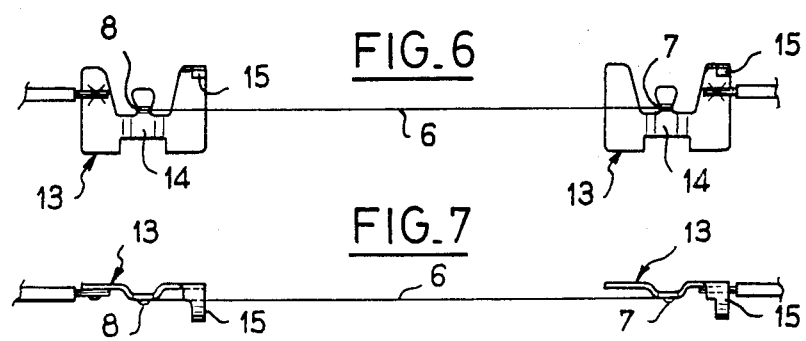

LEVEL SENSOR FOR USE WITH AN ELECTRICALLY INSULATING LIQUID

The present invention relates to a level sensor for sensing the level of an electrically insulating liquid, and it is intended, more particularly, for monitoring the level of oil in the sump of a motor vehicle engine or gearbox.

BACKGROUND OF THE INVENTION

Presently existing sensors comprise an elongate housing which is fixed substantially vertically in the casing containing the liquid, said housing having top and bottom openings and havaving a heat sensitive resistor wire disposed longitudinally therein with the ends of the wire being electrically connected to a feeder and processor circuit enabling the level of the liquid to be monitored at any moment.

An example of a feeder and processor circuit which is well adapted to monitoring an oil level is illustrated in French Pat. No. 2,367,276 (corresponding to U.S. Pat. No. 4,163,391). In general, a current pulse is applied during a predetermined duration (for example, for about two seconds), and the voltage across the ends of the resistive wire is measured at two instants, e.g. at the beginning and at the end of the period during which the current pulse is applied. The difference $\Delta U$ between the measured voltages is compared with a predetermined threshold differnece $\Delta U_O$, and an ON/OFF alarm is triggered when said threshold is past, or an analog output is provided as a function of $\Delta U$.

Such sensors make use of a heat sensitive resistive wire which is V- or W-shaped, thereby providing a considerable length of wire inside the housing even though the volume of the housing remains small. However, there is a lower limit on miniaturization of the sensor due to capillarity phenomena which leave a certain quantity of liquid around the wire, particularly around the middle point of a V-shaped wire or around the bottom points of a W-shaped wire, thereby spoiling the measurement.

In the preferred application of the present invention, i.e. when monitoring the level of oil in the engine or the gearbox of a motor vehicle, there is another factor which interferes with measurement, and that is the unavoidable presence of vibrations in the liquid-containing casing. Because of this, oscillation in the arms of the heat sensitive resistive wire reduce measurement accuracy by accentuating the effects of capillarity at the points in the V- or W-shaped wires, and additionally such oscillations fatigue the wire and may cause it to break.

Attempts have been made to mitigate this drawback by using longitudinal springs to increase the tension in the wire, however, this has the effect of increasing the size of the sensor. One such sensor is described, for example, in published European patent application No. 0,043,312.

Preferred embodiments of the present invention provide a liquid level sensor which is robust, reliable, and less sensitive to disturbances than present sensors, and in particular which has better vibration performance.

Preferred embodiments of the present invention also make it possible to provide a sensor which is particularly compact without disturbing the accuracy of its measurements, and this may lead to other functioal members being included in the sensor housing, e.g. a thermistor.

SUMMARY OF THE INVENTION

The present invention provides a sensor for sensing the level of an electrically insulating liquid, the sensor comprising an elongate housing fixed substantially vertically in a casing containing the liquid whose level is to be sensed, said housing having a top opening and a bottom opening and containing a longitudinally extending heat sensitive V-shaped resistive wire having its ends situated at the top of the housing, said ends being electrically connected to a feeder and processor circuit for monitoring the level of liquid in the casing at any moment, the sensor including the improvement of means for positioning the heat sensitive wire to ensure a substantially constant gap between the two branches thereof over a major portion of their length, and also to ensure that the plane defined by the wire has a position which is stable relative to the elongate housing, said positioning means comprising, at the top, side slots receiving respective connection members associated with each branch of the heat sensitive wire including respective center portions for providing said electrical connections to the corresponding ends of said wire, and, at the bottom, a transverse column fixed to the housing, said column ensuring both the desired separation between the two branches of the wire and support for a resilient fastening member for fastening to the point of the V-shape and disposed behind said column.

In order to provide a particularly robust and compact sensor, the resilient fastening member may comprise a central branch around which the point of the V-shape passes, together with two end branches disposed in the vicinity, respectively, of a base end and of an opposite end of the transverse column. Advantageously, one of the end branches of the resilient fastening member has a portion of the column at said opposite end passing therethrough, while the other end branch of the resilient fastening member is held in abutment against the base end of the column between two adjacent walls provided at the rear of said column, and the rims of the walls provided at the rear of the column serve as an abutment for the portion of the wire situated between the point of the V-shape and the zone in contact with said column.

It is advantageous to be able easily to adapt the sensor in accordance with the invention to a different environment: to this end, each of the connection members extends sideways by means of a curved lug enabling a reference resistance to be fixed in parallel with the heat sensitive resistive wire.

When the housing is made of two half-shells, it is advantageous for the column to project from one of the half-shells, with the free end of a column being received in a corresponding recess in the other half-shell. The resilient fastening member is held even better, if the column has a shoulder against which the corresponding end branch of said member is held by thrust from the adjacent wall of the housing.

Because of the small longitudinal size obtained, it is particularly advantageous to provide for the housing to have a bottom recess behind the column for receiving a thermistor. It is then advantageous for the electrical connection wires for the heat sensitive resistive wire and for the thermistor to leave the housing via the top of the housing.

BRIEF DESCRIPTION OF THE DRAWINGS

An embodiment of the invention is described by way of example with reference to the accompanying drawings, in which:

FIG. 1 is a longitudinal section through a liquid level sensor in accordance with the invention wherein the sensor is shown mounted vertically in a casing containing the liquid to be sensed;

FIG. 2 is a plan view of the FIG. 1 sensor after a cover-forming half-shell has been removed therefrom along a line II—II of the FIG. 1;

FIG. 3 is a fragmentary view on a larger scale showing the bottom end of the FIG. 2 half-shell, without any other components being shown in this figure;

FIGS. 4 and 5 are sections through FIG. 3 respectively on lines IV—IV and V—V;

FIGS. 6 and 7 are a plan view and a side view of a heat sensitive resistive wire and the associated connection members; and FIGS. 8 and 9 are views, on a larger scale, showing the special structure of the resilient fastening member.

MORE DETAILED DESCRIPTION

FIGS. 1 and 2 show a level sensor in accordance with the invention for sensing the level of an electrically insulating liquid. The embodiment shown is particularly advantageous for monitoring the level of oil in the sump of the engine or the gearbox of a motor vehicle as illustrated in FIG. 1, the level sensor embodying the present invention is shown mounted in a casing R which contains a liquid H to be sensed by the sensor. The casing R is oriented with a top and bottom as indicated to provide a vertical orientation of the mounted sensor.

The sensor comprises an elongate housing constituted by two half-shells 1, 1' which are assembled by snap-fastening means. The housing is fixed by means of tabs 2 and 3 in a casing (e.g. a sump, not shown) containing oil, and the housing is fixed so that it occupies a generally vertical position with the tab 3 being at the top. In a manner known per se, the two half-shells of the housing define a top opening 4 and a bottom opening 5 allowing free access for oil and air to the inside of the housing.

A heat sensitive resistive wire 6 is disposed longitudinally inside the housing in a V-shape with its ends 7 and 8 are situated in the top of the housing and are electrically connected to a feeder and processor circuit (not shown) for monitoring the level of the liquid in the casing at any moment.

In accordance with an essential aspect of the invention, the liquid level sensor includes means for positioning the heat sensitive resistive wire 6 in such a manner as to ensure that there is a substantially constant gap between its two branches 9 and 10 over a major portion of their length, that is, the two branches 9 and 10 of the heat sensitive wire 6 are maintained in a parallel, spaced apart relationship the positioning means for the heat sensitive wire 6 insures that the branches 9 and 10 of the wire 6 lie in a plane defined by and coincident with the wire 6 which remains in a position which is stable relative to the elongate housing (in this case the plane defined by the branches 9 and 10 of the wire 6 is essentially contained in the junction plane between the two half-shells). In addition, an element which is essential to the structure of the sensor in accordance with the invention is provided in the form of a resilient fastening member 11 for fastening the point 112 of the V-shape constituted by the wire 6 by bearing against some of said positioning means adjacent to said point, and explained in greater detail below.

The embodiment shown in FIGS. 1 and 2 of the structure of means for positioning the heat sensitive resistive wire is particularly advantageous for obtaining a sensor of small size and having good performance in the presence of vibrations. Thus, near the top, there are side slots 12 which receive a connection member 13 associated with each branch of the heat sensitive wire 6. The special shape of the connection members 13 and the special way in which said members are fastened to the ends 7 and 8 of the wire can be seen more clearly in FIGS. 6 and 7. Each end of the wire is welded or soldered to a middle portion 14 of a corresponding connection member disposed in an associated slot and accurately defining the gap between the ends of the wire (see FIG. 2). In addition, each connection member 13 has a lug 15 for connecting to a reference resistance which is thus connected in parallel with the heat-sensitive resistor wire. The reference resistance 16 is a shunt whose value is selected on manufacture to shunt a few percent of the current applied to the heat-sensitive wire, said shunt having a temperature coefficient which is much smaller than that of the heat-sensitive wire the use of a shunt resistance is well known to those skilled in the art and reference may be had to U.S. Pat. No. 4,163,391 issued Aug. 7, 1979 and assigned to the same assignee as the present invention for further details of the operation of such as shunt and which patent is hereby incorporated by reference. For example, the heat-sensitive wire may be chromium-nickel wire having a diameter of 50 $\mu$ to 100 $\mu$ with a resistance of a few ohms, whereas the resistance of the reference shunt may lie in the range 200 ohms to 2,000 ohms (with the value of said resistances being specified for cold or ambient temperatures). It should be observed that the nested disposition of the two connection members 13 makes it possible to use a single part for them, thereby simplifying storage problems, and that the ends of the wire are both fixed to the same side of the central portions 14, thereby facilitating the use of automatic machinery.

In accordance with an essential aspect of the invention, a transverse column 17 is provided at the bottom of the sensor to ensure that the two branches are separated by the desired gap and also to support the resilient fastening member 11 which is disposed at the rear of said column. FIGS. 3 to 5 show the bottom end of the half-shell 1 of the housing to a larger scale and facilitate understanding the special structure of these wire-positioning means in addition to their co-operation with the resilient fastening member whose own structure is better understood with reference to FIGS. 8 and 9.

The column 17 is thus terminated by a top peg 18 which is cylindrical in shape and projects from a shoulder 19 which defines the base of said peg. Behind the column 17, i.e. going towards the end of the half-shell 1, there are two walls 20 which define between them a recess 21 for receiving one end of the resilient fastening member 11. In addition, the edges of the walls 20 may serve as a bearing surface for the portion of the wire 6 which is situated between the point of the V-shape and the zone of said wire which is in contact with the column 17 (these edges 22 which are shown in FIGS. 4 and 5 occupy the plane defined by the resistive wire when mounted in the sensor).

The resilient fastening member 11 includes a central branch 23 around which the point of the V-shape formed by the resistive wire passes, together with two end branches 24 and 25 which are respectively disposed in the vicinity of the base end and of the free end of the column 17. The end branch 24 thus terminates by means of a lug 26 whose width is substantially equal to the distance between the two walls 20. The outer end branch 25 is washer-shaped and has a central opening 27 enabling the resilient fastening member to be threaded over the peg 18 on the column and to be brought into abutment against the shoulder 19. Thus, as shown in FIG. 1, the half-shell 1' which constitutes the cover has a hollow capable of receiving the peg 18 on the column 17 and of providing constant and reliable thrust against the end branch 25 of the resilient member, thereby ensuring that the resilient member is continuously held in place regardless of vibrations to which the casing may be subject.

Naturally, a liquid level sensor in accordance with the invention may include a heat sensitive resistive wire which is W-shaped. In this case, three columns analogous ot the column 17 are needed, one for each point in the W, with electrical connections being made to the ends of the W-shape by connection members analogous to those already described.

Thus, the structure of the above-described positioning means and the structure of the resilient fastening member for the point of the V-shape serve to ensure that the gap between the two branches of the heat-sensitive wire remains substantially constant over a greater part of the length thereof, i.e. from the ends of said wire to the zone where it comes into contact with the column 17, thereby preventing as far as possible the formation of large meniscuses due to capillarity phenomena, where the point of the V-shape is particularly sensitive to such phenomena. In addition, the plane defined by the wire is given a stable position inside the housing, in particular due to the action of the resilient fastening member which is properly placed relative to the housing, and to the thrust provided for the portion of the wire situated between the point of the V-shape and the zone of contact with the column 17.

The above-described sensor structure thus makes it possible to provide an embodiment of particularly small size. It then becomes advantageous to take advantage of the reduced length of the housing for given performance by providing a bottom recess 28 to the back of the column 17 for receiving a thermistor 29. Such thermistors are widely used as temperature sensors in electrically insulating liquids, and it is well-known that they are reliable in automobile applications. This is particularly advantageous when it is necessary to monitor both the level and the temperature of a liquid, since in accordance with the invention this may be done by means of a combined sensor in the form of a single apparatus, which means that only one measurement hole needs to be provided through the oil-containing casing, thereby reducing assembly costs and requiring only one cable connecting the housing to single processing means. It is naturally advantageous to provide a single outlet located near the top of the housing for all of the various wires connected to the heat-sensitive resistive wire and to the thermistor, as shown in FIG. 1. Advantageously, a spring clip or staple 30 is hinge-mounted in such a manner as to fit the top ends of both half-shells together and also to hold the connection wires in position. 1 end of said staple is held close to an opening 31 provided in the half-shell 1' (a safety opening provided for protection against over-filling with oil), and the other end of the staple which constitutes a hinge serves to hold the outlet wires against traction in any of the directions in which they are likely to be subjected to traction.

The invention is not limited to the above-described embodiments, and it covers any variant using means equivalent to those specified in the claims.

I claim:

1. A sensor for sensing the level of an electrically insulating liquid, the sensor comprising an elongate housing fixed substantially vertically in a casing containing the liquid whose level is to be sensed, said housing having a top opening and a bottom opening and containing a longtiudinally extending heat sensitive V-shaped resistive wire having its end situated at the top of the housing, said wire being arranged for form two substantially parallel branches along a major portion of their longitudinal length, the sensor including the improvement of means for positioning the and fixedly holding the respective end of the heat sensitive wire to ensure a substantially constant gap between the ends of the wire and the two branches thereof over a major portion of their length, said branches of said wire lying in and defining a plane so that the plane defined by the branches of the wire has a position which is stable relative to the elongate housing, said positioning means comprising, at the top of said housing, side slots receiving respective connection members associated with each branch of the heat sensitive wire and each connection member including respective center portions for providing said electrical connections to the corresponding ends of said wire, and, at the bottom of said housing, a transverse column fixed to the housing, said column ensuring both the desired separation between the two branches of the wire and for providing support means for a resilient fastening member for fastening to the point of the V-shape, said fastneing means being disposed behind said column in a direction furthest away from the top of said housing, said fastening member urging said V-shape point of said wire in a direction away from said top of said housing.

2. A sensor according to claim 1, wherein the resilient fastening member comprises a central branch having the point of the V-shape passing thereover, together with two end branches disposed respectively in the vicinity of a base end and of the opposite end of said column.

3. A sensor according to claim 2, wherein one of the end branches of the resilient fastening member has a portion of the column close to said opposite end of the column passing therethrough, whereas the other end branch of the resilient fastening member is held in abutment against the base of the column between two adjacent walls provided to the rear of said column.

4. A sensor according to claim 3, wherein the rims of the walls provided to the rear of the column serve as a bearing surface for that portion of the heat sensitive wire which is situated between the point of the V-shape and its contact zone with said column.

5. A sensor according to claim 1, wherein each of the connection members extends sideways by means of a curved lug enabling a reference resistance to be fixed thereto so as to be connected in parallel with the heat sensitive resistive wire.

6. A sensor according to claim 1, wherein the housing is built up from two half-shells, and wherein the column projects from one of the half-shells with the free end of said column being received in a corresponding recess in the other half-shell.

7. A sensor according to claim 6, wherein the column has a shoulder against which the corresponding end branch of the resilient fastening member is maintained by the wall of the housing adjacent to the recess for said column.

8. A sensor according to claim 1, wherein the housing further includes an internal recess for receiving a thermistor and located behind the column and in a direction further away from the top of said housing and said fastening member.

9. A sensor according to claim 8, wherein the wires for providing electrical connection to the respective ends of said heat sensitive resistive wire and other wires connected to the thermistor leave the housing from the top thereof.

* * * * *